A. A. BORSSE & G. PIRC.
DIRIGIBLE HEADLIGHT.
APPLICATION FILED AUG. 8, 1918.

1,296,261.

Patented Mar. 4, 1919.
2 SHEETS—SHEET 1.

WITNESS:

INVENTORS:
Anton A. Borsse
Georg Pirc
BY
ATTORNEY

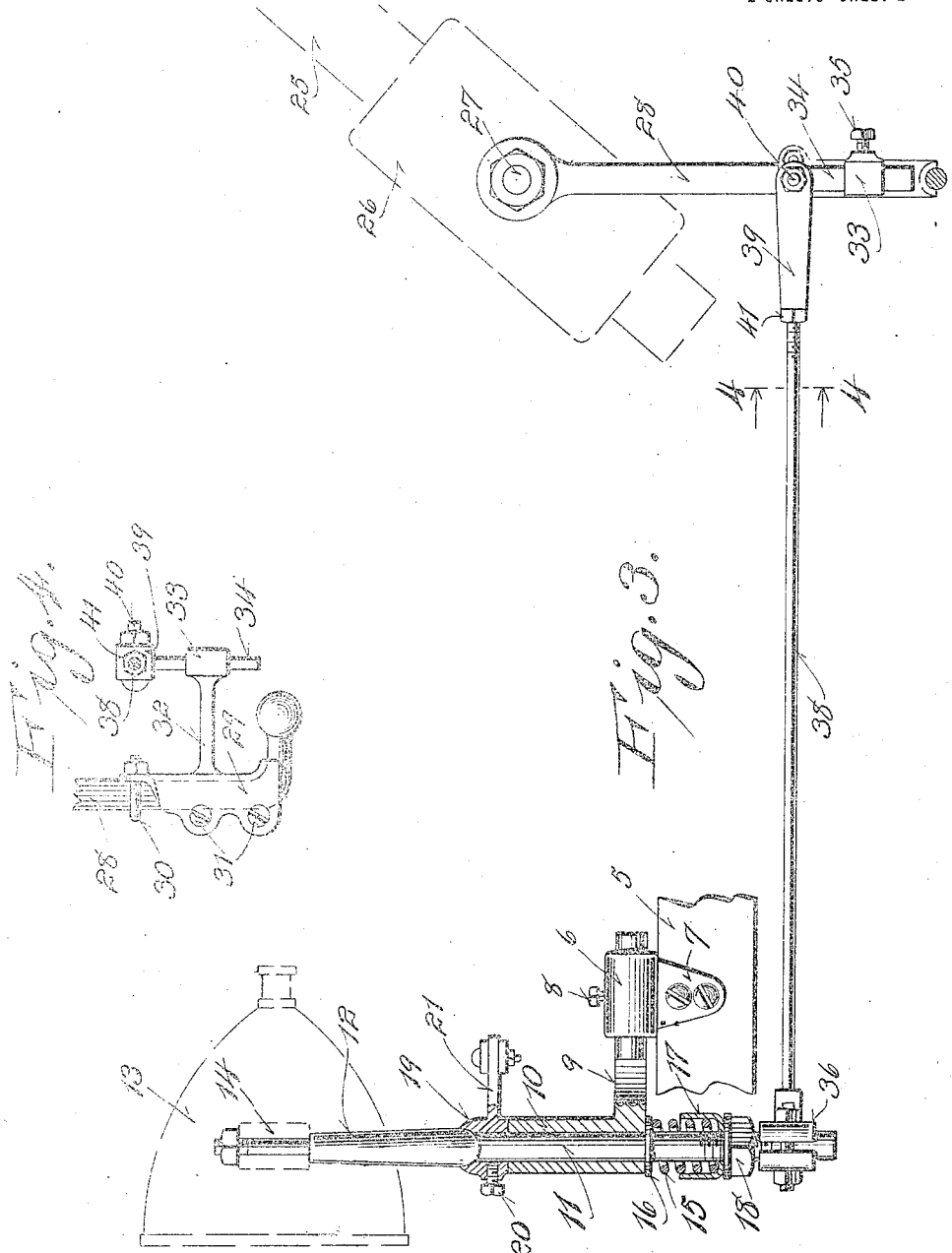

UNITED STATES PATENT OFFICE.

ANTON A. BORSSE AND GEORG PIRC, OF SHEBOYGAN, WISCONSIN.

DIRIGIBLE HEADLIGHT.

1,296,261.  Specification of Letters Patent.  Patented Mar. 4, 1919.

Application filed August 8, 1918. Serial No. 248,939.

*To all whom it may concern:*

Be it known that we, ANTON A. BORSSE and GEORG PIRC, both citizens of the United States, and residents of Sheboygan, in the county of Sheboygan and State of Wisconsin, have invented certain new and useful Improvements in Dirigible Headlights; and we do hereby declare that the following is a full, clear, and exact description thereof.

Our invention relates to new and useful improvements in dirigible headlights for automobiles or other vehicles.

It is in general the object of our invention to simplify and otherwise improve the structure, and to increase the operative efficiency of devices of this character, and it is more particularly our object to provide a dirigible headlight mechanism which may be most readily applied to any one of various makes of cars and which has its parts mutually adjustable to insure their operative relation under various conditions of attachment.

A further and important object resides in the provision of a dirigible headlight mechanism which may be carried entirely by the body frame of an automobile and which may be actuated by frame carried portions of the automobile to thus provide a positive drive connection for the mechanism and eliminate the lost motion and the wearing play between parts which is unavoidable when the mechanism is operated from the steering knuckle connecting rod or other axle carried member, by reason of the spring movement between the axle and body.

With these and other objects and advantages in view, which will be apparent as the description proceeds, our invention resides in the novel features of construction, combination and arrangement of parts as hereinafter described and defined by the appended claims.

In the accompanying drawings:

Fig. 3 is a vertical sectional view through one of the lamp posts, with the actuating mechanism therefor shown in elevation.

Fig. 4 is a transverse sectional view through the connecting link of the actuating mechanism on the line 4—4 of Fig. 3.

Figure 1:
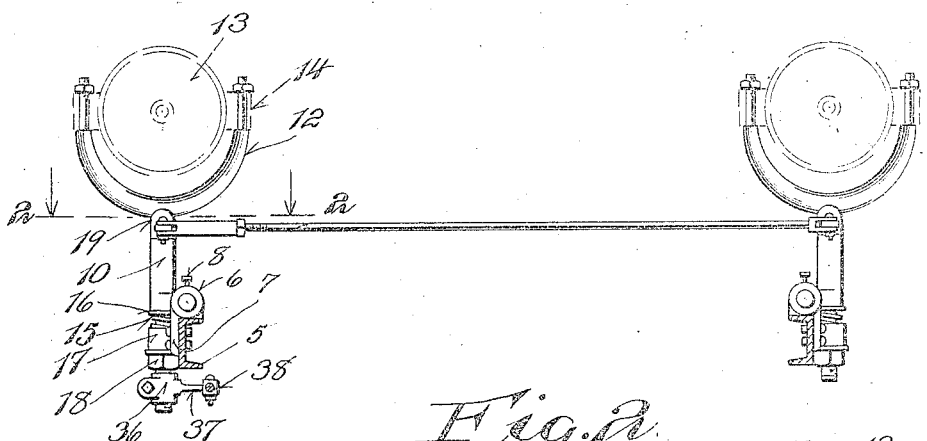
Figure 1 is a sectional view taken transversely through an automobile frame structure having our improved dirigible lamp mechanism associated therewith, the plane of the section line behind the pivotal axes of the lamps, being indicated by the line 1—1 of Fig. 2.
Figure 2:
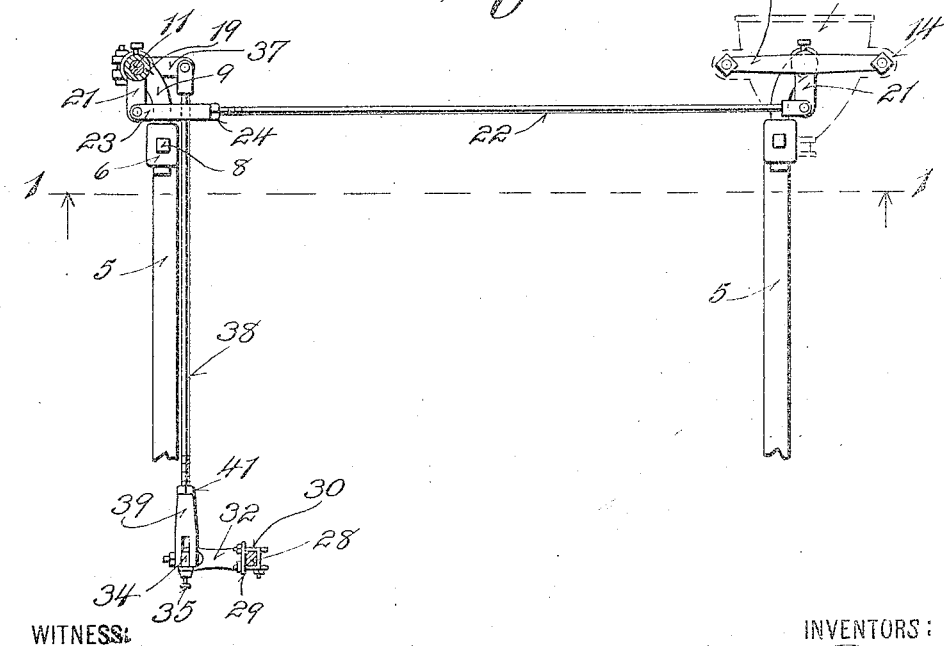
Fig. 2 is a plan view of the frame and mechanism.

Referring now more particularly to the drawings, 5 designates each side sill of an automobile chassis, and for pivotally mounting a lamp post thereon, a horizontally extending sleeve 6 is secured thereto by suitable fastening means passed through a depending lug 7 on the sleeve, the sleeve resting on the top of the sill, with its lug 7 disposed against the outer flat face thereof. Adjustably secured in this sleeve by a set screw 8 passed through the sleeve is an arm 9 which has its forward end curved outwardly of the automobile frame and this forward end of the arm carries an upstanding sleeve post 10, whose bore is thus disposed outwardly of the frame. Slidable in the sleeve post 10 is the shank 11 of a yoke 12 adapted to support a conventional lamp 13, the upper ends of the yoke engaging in the usual attaching sleeves 14 at the sides of the lamp casing. The shank 11 extends below the post, and for holding the yoke against jarring movement, a spring 15 surrounds the shank and bears against a washer 16 on the bottom of the post, the lower end of the spring seating in a cup 17 which is adjustably held on the shank by a nut 18 threaded thereon.

For connecting the pair of lamps 13 thus pivotally mounted, a collar 19 is secured on each shank 11 immediately below its yoke, the upper portion of the collar being slightly bifurcated to partially embrace the bight of the yoke, and the collar being further secured against relative movement by a set screw 20 threaded therein and bearing against the shank. Extending rearwardly from each collar is an arm 21 and these arms are connected by a link 22 which has one end enlarged and bifurcated to pivotally receive one of the arms, while its other end is threaded in one end of an adjusting sleeve 23 which is bifurcated at its other end for pivotally receiving the other arm 21. A lock nut 24 is threaded on the link and bears against the sleeve, and by reason of the threaded connection between the link and sleeve, an adjustment is afforded compensating for variation in distance between the side sills 5 of the automobile chassis, and consequent variation in distance between the pivotal axes of the lamps.

Referring now more particulraly to Figs. 3 and 4, 25 designates in dotted outline the steering column of an automobile having the usual worm casing 26 on its lower ends from which projects the rock arm shaft 27 carrying a depending crank arm 28 terminating in a laterally extending ball-head for connection with a link of the steering mechanism, and we utilize this depending crank arm for directly importing turning movement of the lamp, upon its swinging movement in actuation of the vehicle steering mechanism. Thus, a channel-shaped attaching member 29 is provided which is adapted to embrace the crank arm 28 and which has one end laterally turned to seat on the lower end portion thereof, this attaching member being secured on the arm by a U-bolt 30 embracing the crank arm and passed through the upper portion of the attaching member, and by screws 31 passed through the channel sides of the attaching member. Projecting horizontally from this member is a bracket arm 32 which carries a sleeve 33 in which is vertically slidable a bar 34, adjustably held against sliding movement by a set screw 35. Secured on the lower projected end of the lamp yoke shank 11 adjacent the steering shaft is a split collar 36 carrying an inwardly extending arm 37 to which is pivoted the bifurcated end of a link 38 which extends rearwardly toward the crank carried bar 34 and which has its rear end threadedly engaged in one end of a sleeve 39, which has its other end bifurcated to receive the upper end of the bar 34 for pivotal connection therewith by a bolt 35 passed through its furcation. A lock nut 41 is threaded on the rear end of the link 38 and binds against the sleeve 39. By the threaded engagement of the link 38 in the sleeve 39 an adjustment is provided for variation in the distance between the crank arm 28 and the turning axis of the lamp with which it is thus directly connected, and it is noted that the lamp shanks may be interchangeably associated with their posts 10, whereby the lamp shank which carries the turning arm 37 may be disposed at whichever side of the automobile the steering post is located.

An exceedingly simple, yet operatively positive mechanism has thus been provided which may most readily be attached to any one of various makes of cars, by a person not necessarily skilled in mechanical work, and without the use of any special tools.

It is noted that all the parts of our improved mechanism are carried by the automobile body, and hence relative movement of parts, other than positive operative movements are prevented, with consequent advantages of simplicity, increased durability, and freedom from the possibility of objectionable looseness of parts due to wear.

What is claimed is:

1. A dirigible headlight mechanism including an attaching member adapted for securement to a chassis side sill, an arm extending from said attaching member and having one end curved laterally whereby to lie at one side of the chassis sill, a tubular post on said end of the arm, a yoke including a depending shank pivoted in said post and adapted to extend below the chassis side sill, a laterally extending arm on the lower end portion of the shank, and a link pivotally connected with said arm and adapted for securement to a movable chassis carried portion of the steering mechanism.

2. A dirigible headlight mechanism including a rotatable lamp supporting shank adapted for securement on the body of an automobile, a lateral arm on said shank, an attaching member adapted for securement to a movable chassis carried portion of the steering mechanism, a collar carried by said attaching member, a bar adjustably mounted in said collar, and a link pivotally connected with said bar and with said arm of the rotatable shank.

In testimony that we claim the foregoing we have hereunto set our hands at Sheboygan, in the county of Sheboygan, and State of Wisconsin.

ANTON A. BORSSE.
GEORG PIRC.